Dec. 5, 1939.  G. KONICEK  2,182,259
TRANSFER CART
Filed Oct. 4, 1937
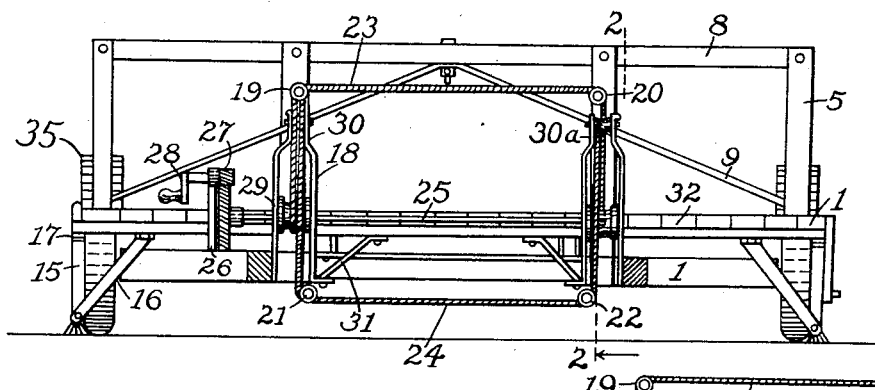
Fig. 1.
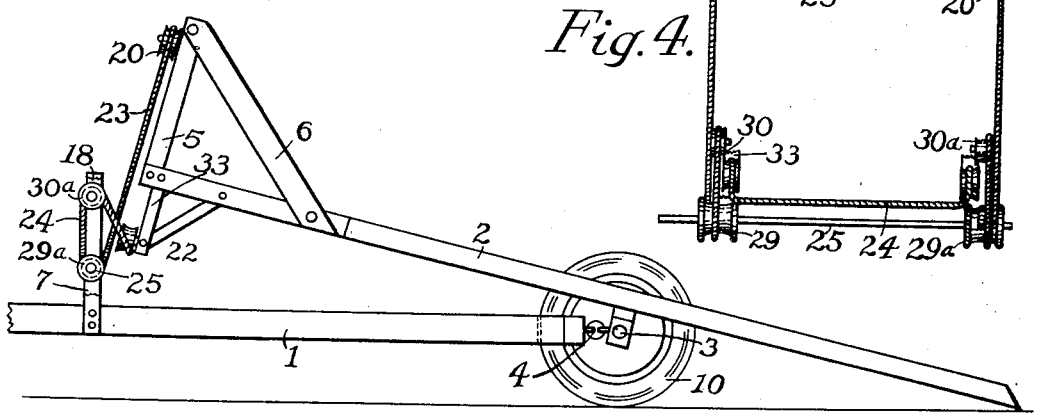
Fig. 4.
Fig. 2.
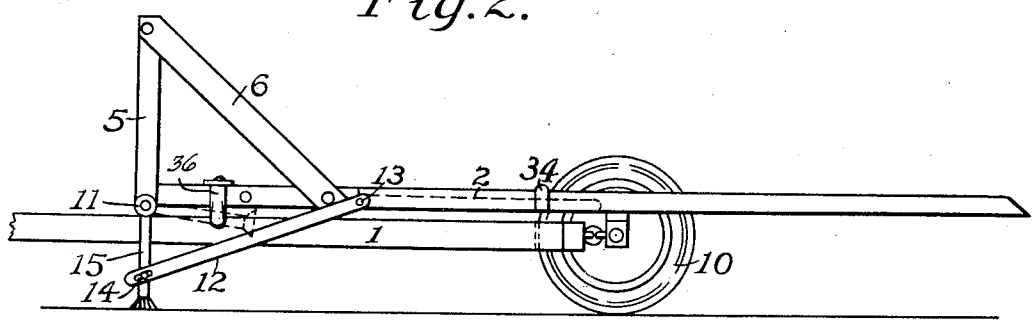
Fig. 3.
Inventor
George Konicek,
By
Attorney

Patented Dec. 5, 1939

2,182,259

UNITED STATES PATENT OFFICE 2,182,259

TRANSFER CART

George Konicek, Bruce Township, Benton County,
Iowa

Application October 4, 1937, Serial No. 167,169

1 Claim. (Cl. 298—19)

My invention relates to improvements in transfer carts, and an object of my improvements is to supply therefor, means for tilting the platform thereof to a load delivering position, including means for self-locking the platform in any desired inclination or when horizontal, and which is also operative in supporting the platform when the cart is to be unloaded or for any other purpose, releasably.

This object I have accomplished by the means and mechanism which are hereinafter described and claimed, also illustrated in the accompanying drawing, it being understood that various equivalent elements and mechanisms may be substituted without departing from my invention and the protection of the appended claim.

This invention also constitutes improvements in and variations from my pending application for patent for Transfer cart, Serial Number 146,232, filed June 3, 1937, now Patent 2,121,153.

Fig. 1 is a front elevation of my improved transfer cart as untilted, and showing parts in cross section. Fig. 2 is a side elevation of the platform in tilted position, with the draft device therefor, and showing the cable actuated means for tiltably moving the platform, other elements being removed or undisclosed. Fig. 3 is a like side elevation, without the cable actuating means, but disclosing one of the forward tiltable legs of the platform and its releasable locking means. Fig. 4, is a diagrammatic front elevation of the cable actuating means for the platform, as in a position for tilting the platform and in elevated position, with the platform and draft device not shown.

In the figures the numeral 1 denotes the usual triangular draft device, loosely linked at opposite sides and rear by links 4 with a cross beam 3 upon which a platform 2 is medially mounted, the forward part of the draft device being broken away, but which may be connected to and hauled by a preceding tractor or otherwise. The platform 2 may be solid or constructed of longitudinal spaced bars as in my said antecedent application. A plurality of uprights 5 are fixed along the front end part of the platform and connected rigidly at their upper ends by a crossbeam 8.

The platform has forward standards 5 and a cross-beam 8, also wheels 10 on the beam 3, the wheels having hoods 35 thereover, and the beam 3 is linked at 4 to the end parts of the beam at rear of the convergent beams 1. A pair of legs 15 with braces 16 are hinged at 11 to the front cross-beam 32, the legs 15 having widened bases, and when swung up are held in clips 36, and side bars 12 at rear ends are pivoted at 13 to the platform 2, and have forward slots to engage releasably over pins in the legs 15. The bars 12 may be swung rearwardly to seat in upturned spring catches 34.

The following means are for tilting and adjustably holding the platform 2. Two pairs of narrowly spaced standards 18 are fixed on the device 1, with sheaves 30 and 30a rotatably mounted between their upper ends, and a rotatable shaft below them at 25 is seated through bearing holes in the standards and has on its left-hand part a worm-wheel 26 engaged by a worm-pinion 27 on a shaft mounted in a post on the device 1, and provided with a crank handle 28. This worm-gearing is self-locking.

Pulleys 19 and 20, spaced horizontally, are mounted on the inner platform posts 5, and other pulleys 21 and 22, also spaced horizontally, are mounted below the pulleys 19 and 20 on the lower ends of braced brackets 33 on the platform 2.

A cable 23 is carried about the pulleys 19 and 20 with end parts end-connected to the rear parts of the sheaves 29 and 29a respectively as shown in Fig. 2. Another cable 24 has its end parts secured also to the rear parts of the sheaves 29 and 29a, thence carried about these sheaves forwardly and under them, then directed upwardly and around the sheaves 30 and 30a respectively and then carried under and between the pulleys 22. The worm-gearing may be used to wind or unwind the cables 23 and 24, thus causing a tilting rearwardly of the platform 2, or returning it to a horizontal position, but the gearing can lock the platform in any tilted position. The draft device 1 is shown broken away forwardly, but may have connection with a tractor or other means for hauling. My transfer cart is adapted for any kind of hauling on a farm or elswhere, with any kind of loading, whether hay and grain in shocks, cut grass, or other things.

I claim:

In a transfer cart, a carrying body medially tiltably mounted on means for transportation, spaced pairs of standards fixed on the means for transportation, a worm gearing mounted on the means for transportation, having a shaft rotatably seated on said pairs of standards, a sheave fixed on said shaft between each pair of standards, a sheave mounted between each pair of standards above the first mentioned sheaves, transversely spaced depending fixed arms on the forward part of the cart body to the rear of each of the said pairs of standards, sheaves on the lower parts of the depending arms, transversely spaced upright fixed arms on the forward part of the cart body to the rear of said pairs of standards, and sheaves rotatably mounted on the upper parts of the upright arms, a cable carried about the last mentioned sheaves with the depending parts of the cable secured to and windable on opposite parts of said shaft and also reeved across the sheaves on the depending arms, and a cable reeved across the sheaves upon said upright arms with end portions reeved across the upper sheaves of the first mentioned pairs of standards, and carried across said shaft in an opposite direction to the reeving of the first cable, and terminally secured to the shaft.

GEORGE KONICEK.